United States Patent
Yamada

(10) Patent No.: US 9,792,078 B2
(45) Date of Patent: Oct. 17, 2017

(54) IMAGE FORMING APPARATUS FOR TRANSMITTING MANAGEMENT INFORMATION VIA A PLURALITY OF NETWORK INTERFACES

(71) Applicant: FUJI XEROX CO., LTD., Minato-ku, Tokyo (JP)

(72) Inventor: Kentaro Yamada, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/467,810

(22) Filed: Aug. 25, 2014

(65) Prior Publication Data
US 2015/0261476 A1 Sep. 17, 2015

(30) Foreign Application Priority Data
Mar. 17, 2014 (JP) .................. 2014-053316

(51) Int. Cl.
*G06F 3/12* (2006.01)
*H04L 29/00* (2006.01)
(Continued)

(52) U.S. Cl.
CPC .......... *G06F 3/1203* (2013.01); *G06F 3/1229* (2013.01); *G06F 3/1288* (2013.01);
(Continued)

(58) Field of Classification Search
CPC ...... G06F 3/1205; G06F 3/121; G06F 3/1203; G06F 3/1229
See application file for complete search history.

(56) References Cited

U.S. PATENT DOCUMENTS

| | | | | |
|---|---|---|---|---|
| 2007/0083797 A1* | 4/2007 | Tsuzuki | ............... | G06F 3/1207 714/48 |
| 2011/0131310 A1* | 6/2011 | Ooba | ..................... | G06F 3/121 709/223 |

(Continued)

FOREIGN PATENT DOCUMENTS

| | | |
|---|---|---|
| JP | 11355332 A | 12/1999 |
| JP | 2001256029 A | 9/2001 |
| JP | 2009-137299 A | 6/2009 |

OTHER PUBLICATIONS

Communication dated Nov. 8, 2016, from the Japanese Patent Office in counterpart application No. 2014-053316, drafted Nov. 4, 2016.

*Primary Examiner* — Benjamin O Dulaney
(74) *Attorney, Agent, or Firm* — Sughrue Mion, PLLC

(57) ABSTRACT

An image forming apparatus includes multiple network interfaces to be connected to different networks, a management-information storage, a management-information generating unit, and a transmitting unit. The management-information storage stores management information. In accordance with a management information transmission request received via one of the network interfaces, the management-information generating unit extracts information which is to be transmitted through the network interface through which the request has been received, from the management information, and generates transmission management information to be transmitted. The transmitting unit transmits the transmission management information generated by the management-information generating unit, from the network interface through which the request has been received.

7 Claims, 10 Drawing Sheets

(51) Int. Cl.
*H04L 12/24* (2006.01)
*H04L 29/06* (2006.01)

(52) U.S. Cl.
CPC .............. *H04L 29/00* (2013.01); *H04L 41/08* (2013.01); *H04L 69/14* (2013.01); *Y02B 60/33* (2013.01)

(56) References Cited

U.S. PATENT DOCUMENTS

2014/0293325 A1* 10/2014 Haapanen ............. G06F 3/1268
  358/1.15
2015/0062626 A1*  3/2015 Hirai ..................... G06F 1/32
  358/1.15
2015/0188611 A1*  7/2015 Tsuzuki .................. H04B 5/02
  455/41.1

* cited by examiner

FIG. 5

MIB INFORMATION TRANSMITTED TO NETWORK A

```
IMAGE FORMING APPARATUS A
ADDRESS : VVV. WWW. XXX. 1
hrPrinterDetectedErrorState        :LowToner(0x20)
prtAlertGroup. 1. 1        :markerSupplies(11)
prtAlertGroupIndex. 1. 1 3
prtAlertCode. 1. 1         :subunitAlmostEmpty(12)
prtAlertDescription. 1. 1   :  "K Toner is Almost empty."

prtMarkerSuppliesType. 1. 3            : toner(3)
prtMarkerSuppliesSupplyUnit. 1. 3      : percent(19)
prtMarkerSuppliesMaxCapacity. 1. 3                : 100
prtMarkerSuppliesLevel. 1. 3           : 5

IMAGE FORMING APPARATUS C
ADDRESS : VVV. WWW. XXX. 2
hrPrinterDetectedErrorState        :LowToner(0x20)
prtAlertGroup. 1. 1        : makerSupplies(11)
prtAlertGroupIndex. 1. 1  :3
prtAlertCode. 1. 1         : subunitAlmostEmpty(12)
prtAlertDescription. 1. 1   :  "K Toner is Almost empty."

prtMarkerSuppliesType. 1. 3            : toner(3)
prtMarkerSuppliesSupplyUnit. 1. 3      : percent(19)
prtMarkerSuppliesMaxCapacity. 1. 3                : 100
prtMarkerSuppliesLevel. 1. 3           : 5
```

MIB INFORMATION TRANSMITTED TO NETWORK B

IMAGE FORMING APPARATUS B
ADDRESS : VVV. WWW. AAA. 1
hrPrinterDetectedErrorState　　　:LowToner(0x20)
prtAlertGroup. 1. 1　　　:markerSupplies(11)
prtAlertGroupIndex. 1. 1 3
prtAlertCode. 1. 1　　　:subunitAlmostEmpty(12)
prtAlertDescription. 1. 1　: "K Toner is Almost empty."

prtMarkerSuppliesType. 1. 3　　　: toner(3)
prtMarkerSuppliesSupplyUnit. 1. 3　: percent(19)
prtMarkerSuppliesMaxCapacity. 1. 3　　　: 100
prtMarkerSuppliesLevel. 1. 3　　　: 5

IMAGE FORMING APPARATUS C
ADDRESS : VVV. WWW. AAA. 2
hrPrinterDetectedErrorState　　　:(0x00)

prtMarkerSuppliesType. 1. 3　　　: toner(3)
prtMarkerSuppliesSupplyUnit. 1. 3　: percent(19)
prtMarkerSuppliesMaxCapacity. 1. 3　　　: 100
prtMarkerSuppliesLevel. 1. 3　　　: −3

SETTING MODE INFORMATION

| MODE SELECTION | APPARATUS MANAGER | NON-MANAGER |
|---|---|---|
| READY-MADE SETTING OR CUSTOM SETTING | 172. 16. 123. 1 | 172. 16. 123. 2<br>172. 16. 123. 3 |

FIG. 7B

READY-MADE SETTING INFORMATION

| | ALERT SETTING INFORMATION | SETTING INFORMATION FOR REMAINING AMOUNTS OF CONSUMABLES | COUNTER SETTING INFORMATION | OTHER SETTING INFORMATION |
|---|---|---|---|---|
| APPARATUS MANAGER | NOTIFY | NOTIFY | NOTIFY | NOTIFY |
| NON-MANAGER | NOT-NOTIFY IF prtAlertGroup IS markerSupplies(11) OR finSupply(31).<br>NOT-NOTIFY IF prtAlertCode IS subunitAlmostEmpty(12) OR subunitLifeAlmostOver(10) OR subunitAlmostFull(14). | prtMarkerSuppliesLevel ← –3<br><br>finSupplyCurrentLevel ← –3 | NOT-NOTIFY | NOTIFY |

FIG. 7C

CUSTOM SETTING INFORMATION

| NETWORK I/F | ALERT SETTING INFORMATION | SETTING INFORMATION FOR REMAINING AMOUNTS OF CONSUMABLES | COUNTER SETTING INFORMATION | OTHER SETTING INFORMATION |
|---|---|---|---|---|
| 172. 16. 123. 1 | | | | |
| 172. 16. 123. 2 | | | | |
| 172. 16. 123. 3 | | | | |

IMAGE FORMING APPARATUS FOR TRANSMITTING MANAGEMENT INFORMATION VIA A PLURALITY OF NETWORK INTERFACES

CROSS-REFERENCE TO RELATED APPLICATIONS

This application is based on and claims priority under 35 USC 119 from Japanese Patent Application No. 2014-053316 filed Mar. 17, 2014.

BACKGROUND (i) Technical Field

The present invention relates to an image forming apparatus, an image forming method, and a computer-readable medium.

(ii) Related Art

A network system may be configured in which, by transmitting management information indicating the state of an image forming apparatus in response to a request from a management apparatus connected to the same network as that to which the image forming apparatus is connected, the management apparatus performs management of the image forming apparatus, such as monitoring of the operation state and resources of the image forming apparatus.

SUMMARY

According to an aspect of the present invention, there is provided an image forming apparatus including multiple network interfaces to be connected to different networks, a management-information storage, a management-information generating unit, and a transmitting unit. The management-information storage stores management information. In accordance with a management information transmission request received via one of the network interfaces, the management-information generating unit extracts information which is to be transmitted through the network interface through which the request has been received, from the management information, and generates transmission management information to be transmitted. The transmitting unit transmits the transmission management information generated by the management-information generating unit, from the network interface through which the request has been received.

BRIEF DESCRIPTION OF THE DRAWINGS

Exemplary embodiment of the present invention will be described in detail based on the following figures, wherein:

FIG. 5 is a diagram illustrating exemplary MIB information transmitted from an image forming apparatus connected to a network serving as an apparatus manager, in the exemplary embodiment;

FIG. 6 is a diagram illustrating exemplary MIB information transmitted from an image forming apparatus connected to a network serving as a non-manager, in the exemplary embodiment;

FIGS. 7A to 7C are diagrams illustrating an exemplary data configuration of setting information stored in a setting-information storage unit according to the exemplary embodiment;

DETAILED DESCRIPTION

An exemplary embodiment of the present invention will be described below on the basis of the drawings.

Figure 1:
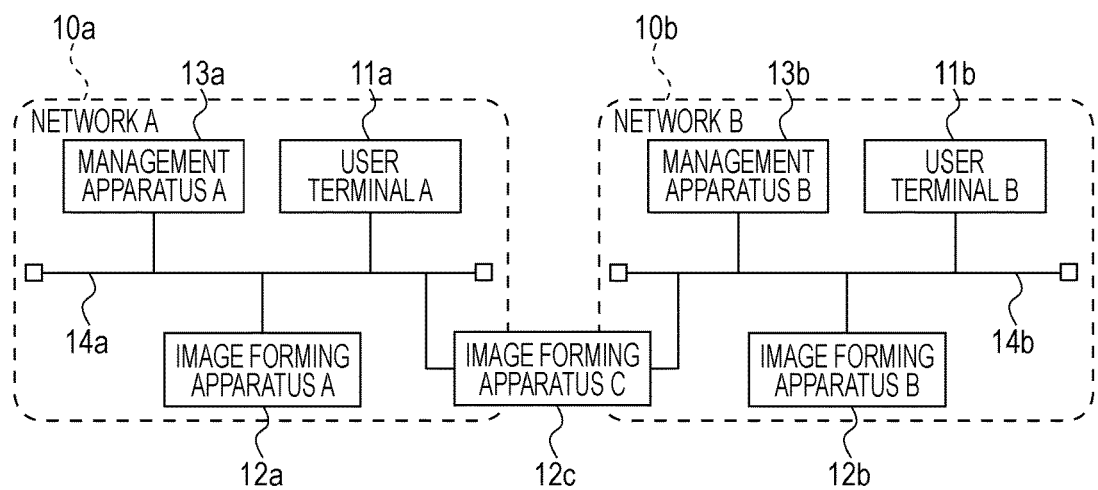
FIG. 1 is a diagram illustrating the configuration of a network system including an image forming apparatus according to an exemplary embodiment of the present invention.

FIG. 1 is a diagram illustrating the configuration of a network system including an image forming apparatus according to an exemplary embodiment of the present invention. FIG. 1 illustrates two network systems (hereinafter, simply referred to as "networks") 10a and 10b illustrated as networks A and B, and an image forming apparatus 12c. The network A has a configuration in which a user terminal 11a, an image forming apparatus 12a, and a management apparatus 13a are connected to a network 14a constituted, for example, by a local-area network (LAN). The network B has a configuration in which a user terminal 11b, an image forming apparatus 12b, and a management apparatus 13b are connected to a network 14b constituted, for example, by a LAN. The image forming apparatus 12c is connected to both of the networks 14a and 14b.

The user terminal 11a in the network A is implemented by using a personal computer (PC) or the like from which the image forming apparatus 12a and the image forming apparatus 12c may be used. The management apparatus 13a manages the image forming apparatus 12a and the image forming apparatus 12c which are connected to the same network, i.e., the network 14a. Specifically, for example, to monitor the operation states and resources (for example, consumables) of the image forming apparatuses 12a and 12c, the management apparatus 13a transmits an inquiry to the image forming apparatuses 12a and 12c, i.e., request for transmission of MIB (management information base) information, thereby receiving MIB information from the image forming apparatuses 12 to which the inquiry has been transmitted, and referring to the MIB information. In the present exemplary embodiment, Simple Network Management Protocol (SNMP) is used in monitoring of the image forming apparatuses 12 which is performed by the management apparatus 13. That is, in the present exemplary embodiment, the management apparatus 13 serves as an SNMP manager, and the image forming apparatuses 12 serve as an SNMP agent. The network B has the same configuration as that of the network A, and will not be described. However, as described in detail below, in the present exemplary embodiment, the management apparatus 13a manages the image forming apparatus 12c connected to the multiple networks. Therefore, the management apparatus 13b manages the image forming apparatus 12b, but not the image forming apparatus 12c. In FIG. 1, for the sake of convenience, other than the image forming apparatus 12c connected to both of the networks 14a and 14b, each of the networks A and B has only one user terminal 11 and only one image forming apparatus 12. The number of user terminals 11 and the number of image forming apparatuses 12 are not limited to one, and the network A does not necessarily include the same number of user terminals 11 or image forming apparatuses 12 as that in the network B.

Figure 2:
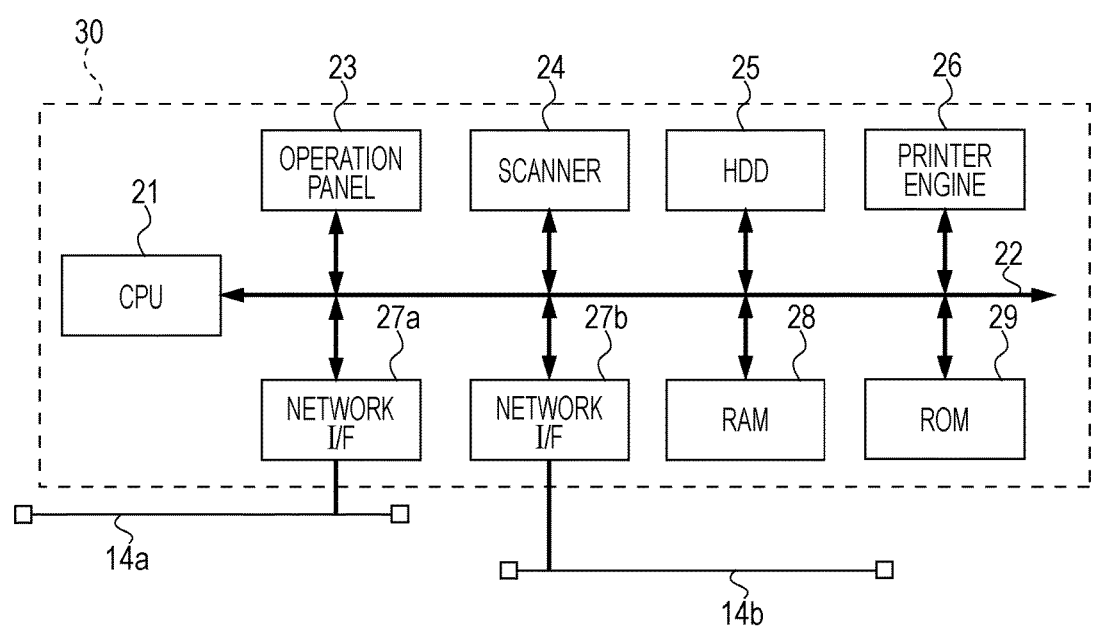
FIG. 2 is a diagram illustrating the hardware configuration of the image forming apparatus according to the exemplary embodiment.

FIG. 2 is a diagram illustrating the hardware configuration of an image forming apparatus 30 according to the present exemplary embodiment. The image forming apparatus 30 corresponds to the image forming apparatus 12c connected to multiple networks (two networks in FIG. 1) in FIG. 1. The image forming apparatus 30 is a multi-function device having various functions, such as a print function, a copy function, and a scanner function, and is an apparatus including a computer. In FIG. 2, a central processing unit (CPU) 21 controls operations of various units included in the apparatus, such as a scanner 24 and a printer engine 26, according to programs stored in a read-only memory (ROM) 29. An address data bus 22 connects the various units which are targets of the control of the CPU 21, to one another, and performs data communication. An operation panel 23 accepts an instruction given by a user, and displays information. In the present exemplary embodiment, the operation panel 23 is used to set setting information. The scanner 24 reads out a document which is set by a user, and accumulates it as electronic data in a hard disk drive (HDD) 25 or the like. The HDD 25 stores an electronic document or the like which is obtained by reading out a document by using the scanner 24. The printer engine 26 prints an image on an output sheet in accordance with instructions from a control program executed by the CPU 21. A random-access memory (RAM) 28 is used as a work memory used when programs are executed, or as a communication buffer used when electronic data is received or transmitted. The ROM 29 stores various programs for control of the apparatus, an SNMP agent, and the like. Execution of the various programs causes the components described below to perform predetermined functions.

The image forming apparatus 30 according to the present exemplary embodiment includes multiple network interfaces (I/Fs) 27. A network interface (I/F) 27 is connected to a network 14, and is used for reception of a job, reception and transmission of an SNMP message, and the like which are performed through the network 14. FIG. 2 illustrates an example in which two network interfaces (I/Fs) 27a and 27b are connected to the address data bus 22 in order that the two different networks 14a and 14b are connected to the respective network I/Fs 27a and 27b as illustrated in FIG. 1.

The image forming apparatuses 12a and 12b illustrated in FIG. 1 may have a configuration similar to that of the image forming apparatus 30. Each of the image forming apparatuses 12a and 12b is connected to only one network, i.e., a corresponding one of the networks 14a and 14b. Therefore, each of the image forming apparatuses 12a and 12b may have only one network interface 27.

The management apparatus 13 according to the present exemplary embodiment may be implemented by using a hardware configuration of a general-purpose server of the related art. That is, the management apparatus 13 includes a CPU, a ROM, a RAM, a HDD, a network interface, and an input/output unit.

Figure 3:
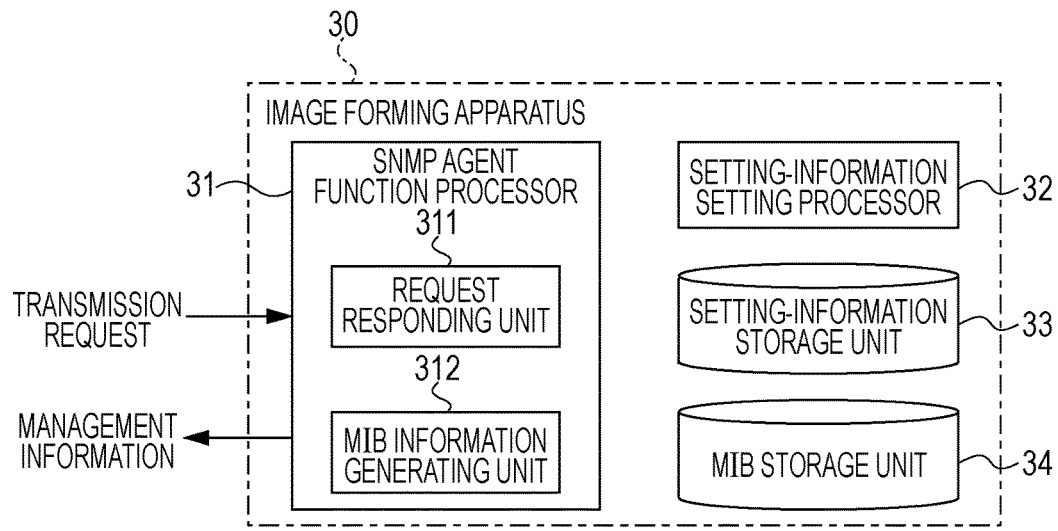
FIG. 3 is a block diagram illustrating the configuration of the image forming apparatus according to the exemplary embodiment.

FIG. 3 is a block diagram illustrating the configuration of the image forming apparatus 30 according to the present exemplary embodiment. The image forming apparatus 30 includes an SNMP agent function processor 31, a setting-information setting processor 32, a setting-information storage unit 33, and an MIB storage unit 34. Needless to say, other than these, the image forming apparatus 30 includes units for performing various functions, such as printing, which are provided by the image forming apparatus 30. Components which are not used in the description of the present exemplary embodiment will not be described.

The SNMP agent function processor 31 is a unit for causing the apparatus to function as an SNMP agent, and includes a request responding unit 311 and an MIB information generating unit 312. The request responding unit 311 receives a request for transmission of MIB information via either one of the network interfaces 27, thereby receiving the inquiry. The request responding unit 311 serves as a transmitting unit, and transmits MIB information generated by the MIB information generating unit 312 in response to the inquiry, through the network interface 27 through which the transmission request has been received. The MIB information generating unit 312 serves as a management-information generating unit. In response to the transmission request for MIB information which is received via either one of the network interfaces 27 by the request responding unit 311, the MIB information generating unit 312 extracts information which is to be transmitted through the network interface 27 through which the transmission request has been received, in accordance with setting information from the MIB information, and generates MIB information to be transmitted.

In an MIB stored in the MIB storage unit 34, MIB information to be published so that the outside is informed of the conditions of the apparatus is defined. In the present exemplary embodiment, the MIB is used according to RFC3805 (Printer MIB V2). The MIB information obtained on the basis of the MIB corresponds to the above-described management information. The setting-information setting processor 32 which serves as a setting-information generating unit generates setting information in accordance with a setting operation performed by a user, and registers it in the setting-information storage unit 33.

The components 31 and 32 in the image forming apparatus 30 are implemented through an operation which is performed in a cooperative manner by the computer included in the image forming apparatus 30 and programs executed by the CPU 21 included in the computer. The storage units 33 and 34 are implemented by using the HDD 25 included in the image forming apparatus 30.

Programs used in the present exemplary embodiment may be provided not only through a communication unit but also through a computer-readable recording medium, such as a Universal Serial Bus (USB) or a digital versatile disk-read only memory (DVD-ROM), by storing the programs in the computer-readable recording medium. The programs provided through a communication unit or a recording medium are installed in the computer, and the CPU of the computer executes the programs one by one, achieving the various processes.

In the present exemplary embodiment, when MIB information is to be transmitted as a response to the inquiry, all pieces of the MIB information corresponding to the inquiry are not necessarily transmitted. Information extracted from the MIB information in accordance with the setting information is generated as MIB information which is to be transmitted, and is transmitted through the network interface 27 through which the inquiry has been received. In the present exemplary embodiment, before the image forming apparatus 30 transmits MIB information in response to a transmission request from a network, the setting information needs to be set. Before the setting information is described, an operation in the present exemplary embodiment will be described by using the flowchart illustrated in FIG. 4. Description will be made under the assumption that the image forming apparatus 30 which is a characteristic configuration in the present exemplary embodiment corresponds to the image forming apparatus C in the system configuration illustrated in FIG. 1. The network A connected to the network interface 27a is a network serving as the apparatus manager, and the management apparatus A included in the network A operates as a management apparatus which manages the image forming apparatus C. The network interface 27a connected to the network A serving as the apparatus manager is a network interface for the apparatus manager. The network B which is connected to the network interface 27b for a non-manager, not for the apparatus manager, is a network as a non-manager. The management apparatus B included in the network B as a non-manager does not manage the image forming apparatus C. The setting-information storage unit 33 stores setting information describing whether each of the network interfaces 27a and 27b operates for the apparatus manager or for a non-manager.

When the request responding unit 311 of the SNMP agent function processor 31 in the image forming apparatus C receives an inquiry (transmission request for MIB information) via either one of the network interfaces 27 (in step 110), the request responding unit 311 specifies the network interface 27 through which the inquiry has been received (in step 120).

If the network interface 27 through which the inquiry has been received is the network interface 27a for the apparatus manager (YES in step 130), the MIB information generating unit 312 generates MIB information for the apparatus manager as MIB information which is to be transmitted (in step 140). The MIB information generated when the network interface 27 through which the inquiry has been received operates for the apparatus manager may be the same information as MIB information generated when an image forming apparatus has only one network interface 27.

If the network interface 27 through which the inquiry has been received is the network interface 27b for a non-manager (NO in step 130), the MIB information generating unit 312 generates MIB information for a non-manager as MIB information which is to be transmitted (in step 150).

As described above, when the MIB information to be transmitted is generated, the request responding unit 311 transmits the generated MIB information through the network interface 27 through which the inquiry has been received (in step 160). Specifically, when the management apparatus A has transmitted the inquiry, the management apparatus A receives the MIB information for the apparatus manager from the image forming apparatus C. When the management apparatus B has transmitted the inquiry, the management apparatus B receives the MIB information for a non-manager from the image forming apparatus C.

FIG. 5 illustrates MIB information received by the management apparatus A from the image forming apparatus C, and MIB information received from the image forming apparatus A for reference. FIG. 6 illustrates MIB information received by the management apparatus B from the image forming apparatus C, and MIB information received from the image forming apparatus B for reference. As it is clear when the MIB information from the image forming apparatus A is compared with that from the image forming apparatus C illustrated in FIG. 5, the data configuration of the MIB information for the apparatus manager which is transmitted from the image forming apparatus C is similar to that from the image forming apparatus A having only one network interface.

In contrast, as it is clear when the MIB information for the apparatus manager which is transmitted by the image forming apparatus C to the network A illustrated in FIG. 5 is compared with that for a non-manager which is transmitted by the image forming apparatus C to the network B illustrated in FIG. 6, information 41 about alerts for consumables illustrated in FIG. 5 is not included in the MIB information for the non-manager which is transmitted by the image forming apparatus C to the network B. Even when a request for transmission of information about alerts for consumables is transmitted from the management apparatus B, such information is not included. The value of "prtMarkerSuppliesLevel.1.3" which indicates the remaining amount of toner and which is described in the last line in the MIB information for a non-manager is rewritten to "−3" which indicates the state in which printing may be performed, instead of 5% which is the correct value as illustrated in FIG. 5.

For example, information about an error indicating that the image forming apparatus C does not operate due to an anomaly is information of which not only the user terminal A but also the user terminal B using the image forming apparatus C is to be informed. Therefore, information about the error is to be transmitted to all of the networks A and B. In contrast, for example, if the MIB information including alert information such as insufficiency of toner is transmitted to all of the networks A and B, the administrator of each of the management apparatuses A and B who receives the MIB information may refer to the alert information included in the received MIB information, and may order the toner. That is, the toner may be ordered in a duplicate manner.

In the present exemplary embodiment, when an image forming apparatus is connected to multiple networks, one of the networks (i.e., the network interface 27 connected to the network) is set as the apparatus manager, and the others of the networks (i.e., the network interfaces 27 connected to the other networks) are set as a non-manager. The MIB information including information about consumables as in the MIB information of the related art is generated only for the network serving as the apparatus manager, and the MIB information which does not include information about consumables is compulsorily generated for the networks serving as a non-manger. Thus, the management apparatus 13b in the network serving as a non-manager fails to detect information about consumables. Therefore, consumables are not ordered. In addition, as described above, the value of the remaining amount of toner which indicates insufficient toner is replaced with the value indicating the normal state (in which printing may be performed). Accordingly, while the user terminal 11b in the network serving as a non-manager does not know that the image forming apparatus 12c may fail to be continuously used due to insufficiency of consumables or the like, the user terminal 11b continuously use the image forming apparatus 12c. Consumables are ordered on the network A side, and are replaced. Therefore, the image forming apparatus 12c is used without any trouble.

In the present exemplary embodiment, as partially described in the description about the process, when the MIB information for a non-manager is to be generated, even in the case where the information prtAlertGroup in the MIB information has a value of markerSupplies (11) or finSupply (31), this information is not transmitted to a non-manager. The number added to an MIB symbol represents the last number of an object identifier (OID). The value of prtMarkerSuppliesLevel which indicates the remaining amount or the remaining life of a consumable item is changed to "−3" which is a value indicating that printing may be performed and being used for a consumable item whose remaining amount fails to be obtained. The value of finSupplyCurrentLevel which indicates the remaining amount of a consumable item in the finisher is also changed to "−3".

These types of MIB information represent information about consumables. The information about consumables is included in information referred to in order to enable the image forming apparatus C to be continuously used. Among all of the MIB information defined in the MIB stored in the MIB storage unit 34, specific information specified as being transmitted only to the network serving as the apparatus manager, such as the above-described information about consumables, is set in advance in the setting information described below. Non-specific information other than specific information may be transmitted to either of the network serving as the apparatus manager and a network serving as a non-manager.

As described above, MIB information to be transmitted is different depending on whether or not the destination network serves as the apparatus manager. The setting information to be set in advance before the MIB information is transmitted in the present exemplary embodiment as described above will be described.

In the present exemplary embodiment, to make setting of MIB information transmitted via a network interface 27, two setting modes, i.e., the ready-made setting and the custom setting, are provided. The ready-made setting is a mode in which preset settings, such as a setting which determines which MIB information is to be transmitted, and a setting which determines whether or not the value is to be changed upon transmission, are employed for the apparatus manager and a non-manager. This is a mode using so-called initial settings.

Figure 8:
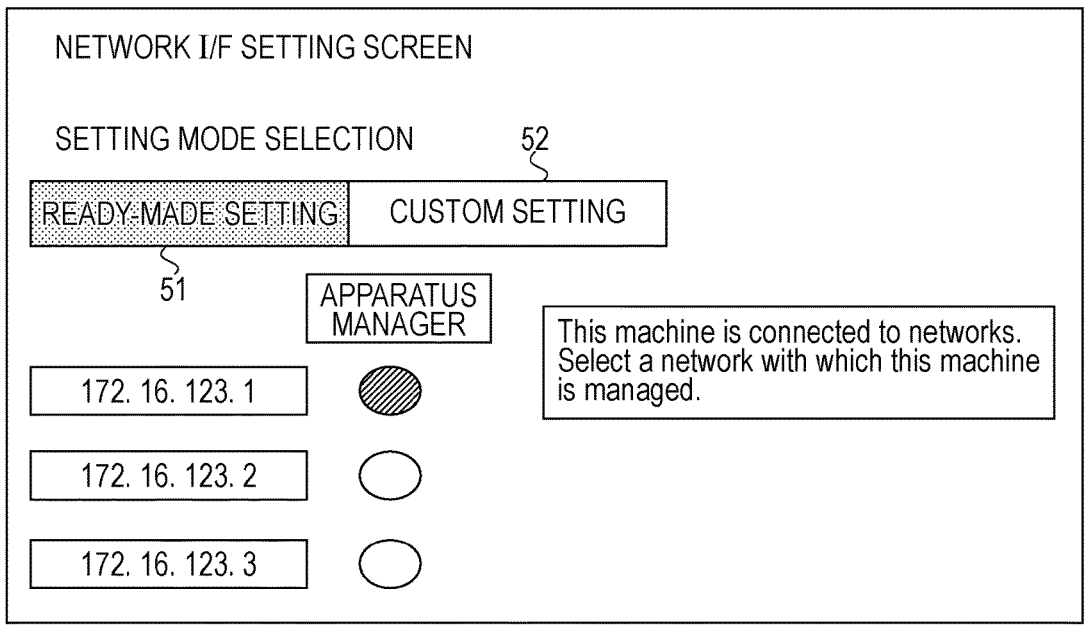
FIG. 8 is a diagram illustrating an exemplary setting screen in the ready-made setting mode in the exemplary embodiment.

FIGS. 7A to 7C are diagrams illustrating an exemplary data configuration of the setting information stored in the setting-information storage unit 33 according to the present exemplary embodiment. FIG. 8 is a diagram illustrating an exemplary setting screen displayed on the operation panel 23 when a user selects the ready-made setting as the setting mode. The setting of the setting information using display screens illustrated in FIGS. 8 to 13 may be remotely performed, not from the operation panel 23.

In FIGS. 1 and 2, the description is made by taking an image forming apparatus including two network interfaces, as an example. FIG. 8 illustrates a setting screen for setting the setting information for an image forming apparatus including three network interfaces, and specifically illustrates an exemplary setting screen in the ready-made setting mode. In the ready-made setting, it is only required that a user select which network interface operates for the apparatus manager. In FIG. 8, an example is illustrated in which the network interface to which the address 172.16.123.1 is set is selected as one operating for the apparatus manager. Only one network interface operates for the apparatus manager. Therefore, the network interfaces of 172.16.123.2 and 172.16.123.3 are unconditionally selected as those operating for a non-manager.

The information which is set from a setting screen is stored in setting mode information included in the setting information. The setting mode information includes a mode selected by a user (ready-made setting or custom setting) and identification information (address) of each of the network interfaces specified as operating for the apparatus manager or for a non-manager, as illustrated in FIG. 7A.

In ready-made setting information included in the setting information, information describing which piece of MIB information is to be transmitted is set in advance for the apparatus manager and a non-manager. In the present exemplary embodiment, pieces of MIB information are classified as alert information, information about the remaining amounts of consumables, counter information, and the other information, as illustrated in FIG. 7B. The present invention is not necessarily limited to this classification. Furthermore, use of classification is not necessary to manage MIB information. Similarly to the MIB information of the related art, all of the pieces of MIB information are to be transmitted for the apparatus manager. Therefore, each of the classifications is set to "NOTIFY" which indicates that the MIB information is to be transmitted, for the apparatus manager. A piece of MIB information for a non-manager may be set as being not transmitted, or may be set as one whose value is to be changed. When all of the pieces of MIB information in a classification are not to be transmitted, "NOT-NOTIFY" is set as illustrated in the classification "counter setting information".

The pieces of MIB information for a non-manager for which restriction on transmission of the information and modification of the value are set correspond to the specific information specified in advance through setting. For these pieces of specific information, according to the setting information, values obtained from the units (controllers for toner, trays, and the like) of the image forming apparatus are transmitted only to the network interface operating for the apparatus manager, and are not transmitted to the network interfaces operating for a non-manager, or the values are modified and transmitted. For pieces of MIB information corresponding to the non-specific information which is not the specific information, it is determined whether or not transmission is to be performed, on the basis of the setting information in the ready-made setting information (such as "NOTIFY" and "NOT-NOTIFY").

The setting screen illustrated in FIG. 8 may be used not only as a setting screen for the ready-made setting but also as a mode selection screen in which the current setting mode is selected by selecting either one of buttons 51 and 52 for the ready-made setting and the custom setting.

The custom setting will be described. The ready-made setting is a mode in which information which is initially set for the apparatus manager and a non-manager is applied as it is. The custom setting is a mode in which a user inputs individual settings for the apparatus manager and a non-manager, such as a setting determining which piece of MIB information is to be transmitted, and a setting about pieces of MIB information whose values are to be modified.

Figure 9:
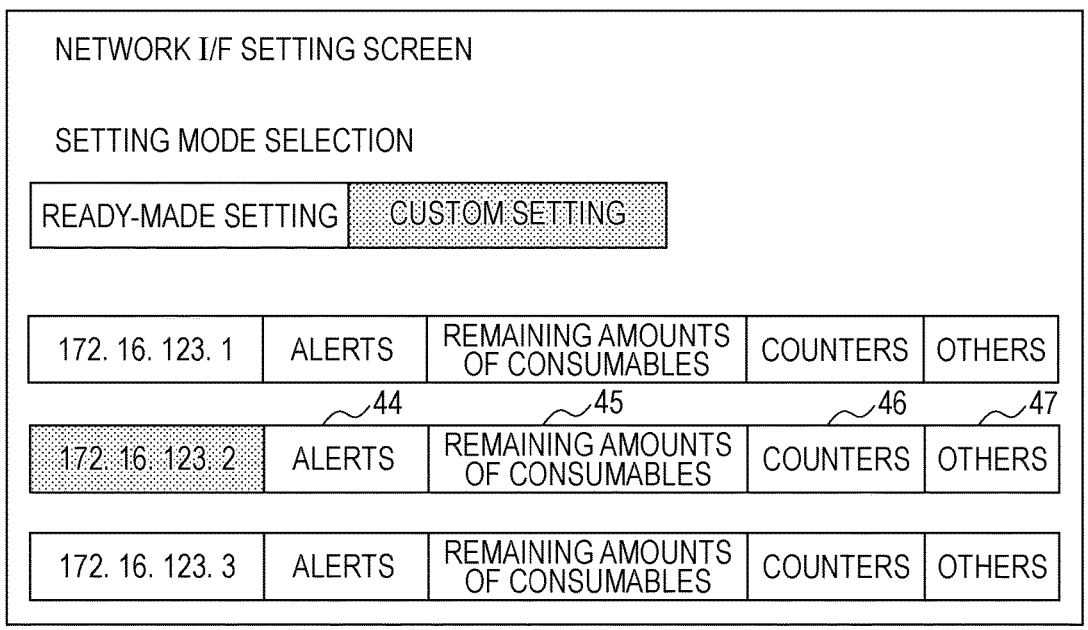
FIG. 9 is a diagram illustrating an exemplary setting screen in the custom setting mode in the exemplary embodiment.

FIG. 9 illustrates a setting screen for setting the setting information for an image forming apparatus including three network interfaces, and particularly illustrates a setting screen for the custom setting. In the custom setting, a user selects a network interface on which setting is performed, and performs setting as follows.

Figure 10:
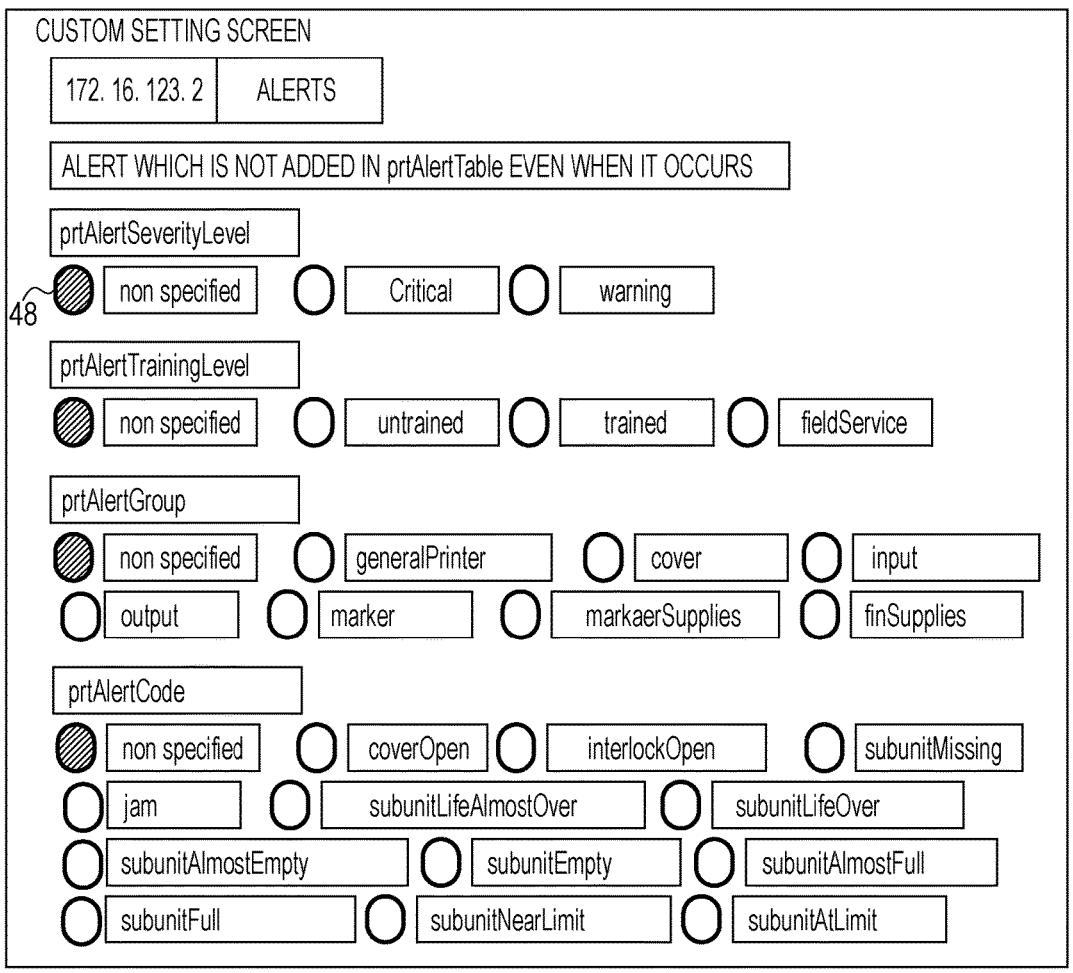
FIG. 10 is a diagram illustrating an exemplary setting screen for setting information about alerts in the custom setting mode in the exemplary embodiment.

FIG. 10 illustrates an exemplary setting screen displayed after the network interface of 172.16.123.2 is selected as a target to be set, when a button 44 for setting alerts is selected in FIG. 9. In this screen, MIB symbols corresponding to the MIB information about alerts are displayed. Therefore, a user selects a selection button 48 corresponding to an MIB symbol which is to be transmitted (or "none specified") from the screen, thereby selecting pieces of MIB information to be transmitted. In the setting screen, pieces of MIB information which are to be transmitted may be selected, or pieces of MIB information which are not to be transmitted may be selected.

Figure 11:
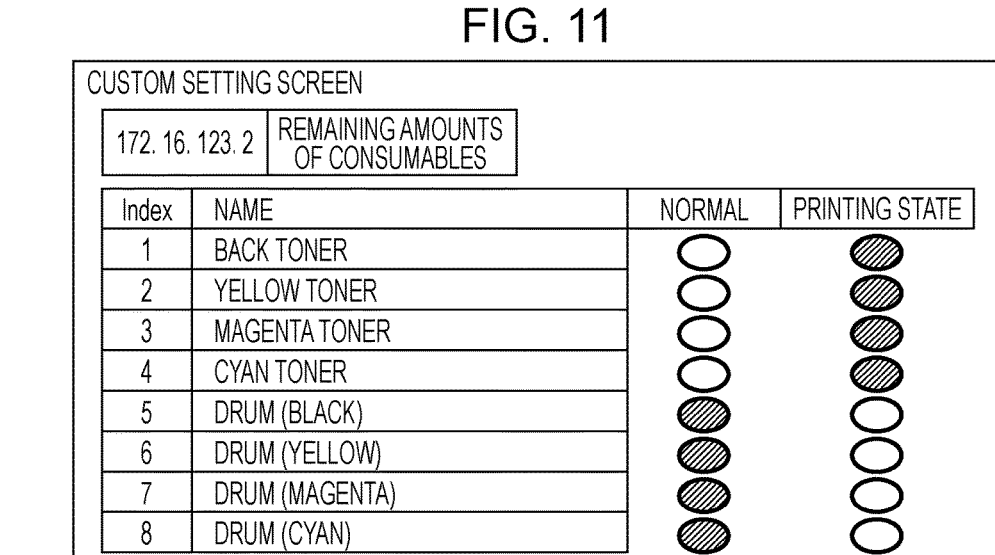
FIG. 11 is a diagram illustrating an exemplary setting screen for setting information about the remaining amounts of consumables in the custom setting mode in the exemplary embodiment.

FIG. 11 illustrates an exemplary setting screen displayed after the network interface of 172.16.123.2 is selected as a target to be set, when a button 45 for setting the remaining amounts of consumables is selected in FIG. 9. In this screen, settings are made which, when the remaining amount becomes insufficient, determine which operation from the following operations is to be performed: an operation in which the actual value indicating the remaining amount is transmitted (selection of "normal"); and an operation in which information describing that printing may be performed is always transmitted (selection of "printing state").

Figure 12:
FIG. 12 is a diagram illustrating an exemplary setting screen for setting information about counters in the custom setting mode in the exemplary embodiment.

FIG. 12 illustrates an exemplary setting screen displayed after the network interface of 172.16.123.2 is selected as a target to be set, when a button 46 for setting counters is selected in FIG. 9. In this screen, settings are made which determine whether an actual counter value is transmitted (selection of "normal") or a counter value is not transmitted (selection of "0").

Figure 13:
FIG. 13 is a diagram illustrating an exemplary setting screen for setting other information in the custom setting mode in the exemplary embodiment.

FIG. 13 illustrates an exemplary setting screen displayed after the network interface of 172.16.123.2 is selected as a target to be set, when a button 47 for setting other items is selected in FIG. 9. In this screen, settings which describe that 0 is always transmitted as the value of the illustrated OIDs are made for other items. The setting screen illustrated in FIG. 13 is an example, and various types of settings for MIB information may be made for other items.

The setting from the above-described setting screens is performed on each of the network interfaces, and the setting information for each of the network interfaces is stored in a corresponding one of item areas corresponding to custom setting information illustrated in FIG. 7C.

In the present exemplary embodiment, only one network interface operates for the apparatus manager, and the other network interfaces operate for non-managers. Therefore, in the case of the custom setting, a network interface which is set as one through which the specific information is transmitted may be automatically recognized as one operating for the apparatus manager. Alternatively, as in the ready-made setting, a user may explicitly specify the network interface operating for the apparatus manager. In either case, the specific information needs to be transmitted to only one network interface. Therefore, a process for preventing a setting which causes the specific information to be transmitted to multiple network interfaces from being made may be performed by the setting-information setting processor 32.

Figure 4:
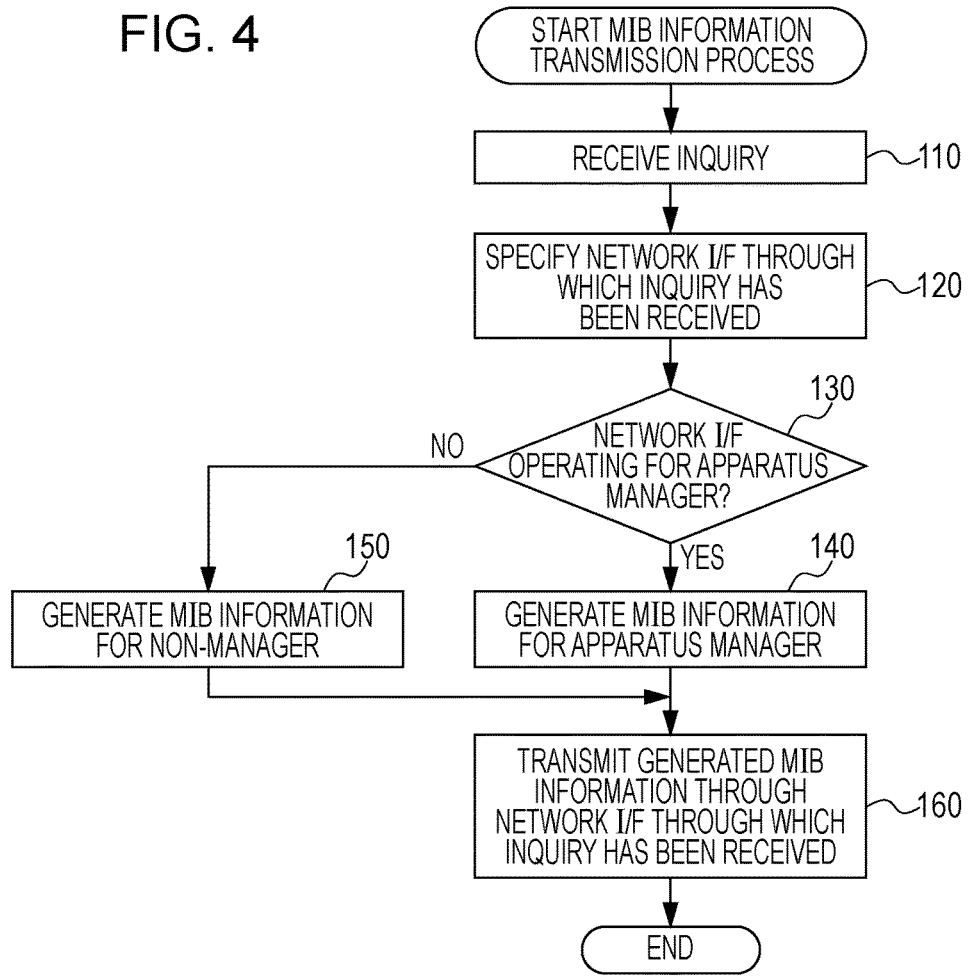
FIG. 4 is a flowchart of a process of transmitting management information base (MIB) information in the exemplary embodiment.
Figure 14:
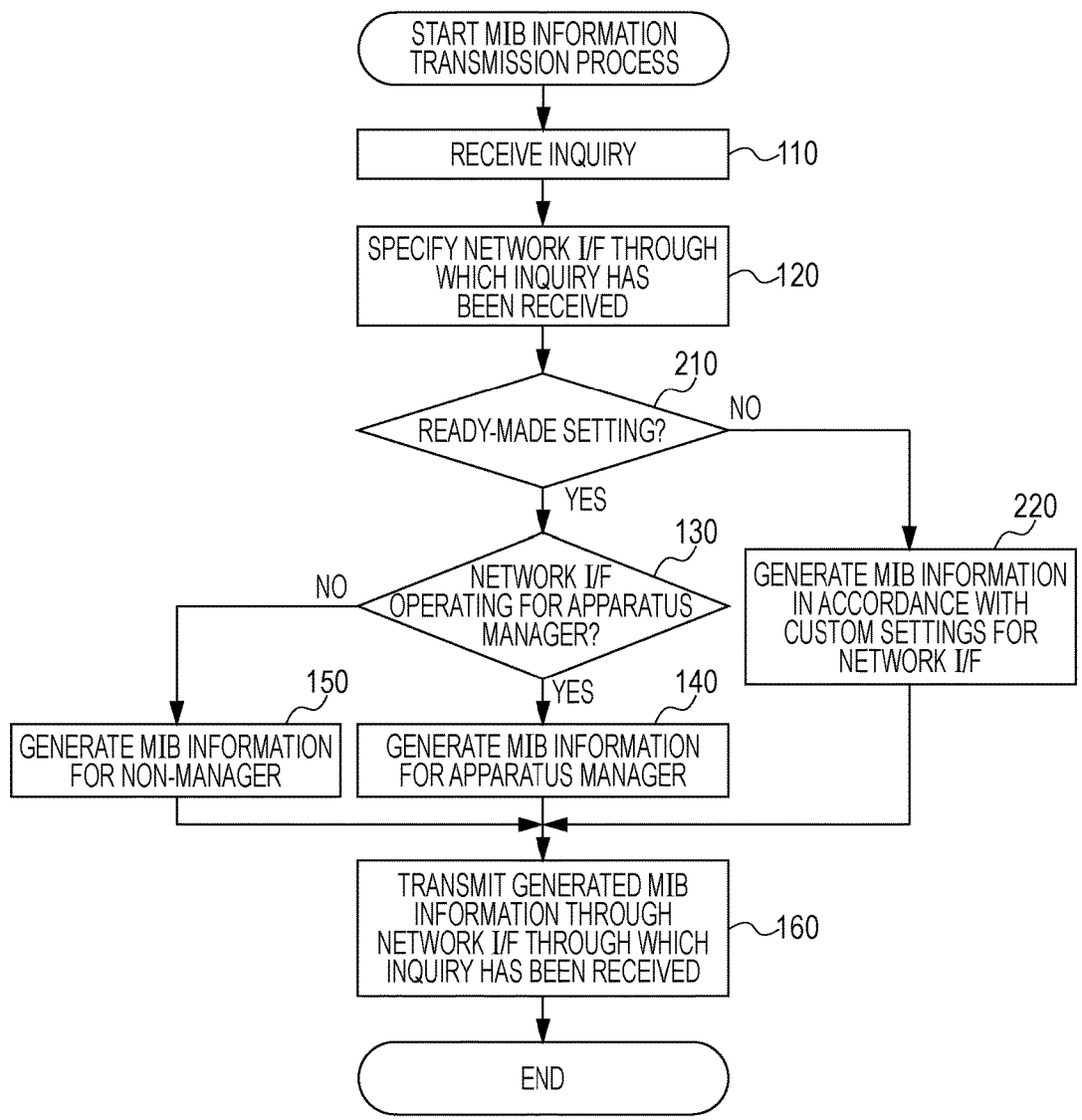
FIG. 14 is a flowchart of another process of transmitting MIB information in the exemplary embodiment.

A process of transmitting the MIB information in the present exemplary embodiment which is performed in consideration of the ready-made setting and the custom setting will be described by using the flowchart illustrated in FIG. 14. The same processes as those in FIG. 4 are designated with identical reference characters, and are not described as appropriate.

When the request responding unit 311 receives an inquiry via either one of the network interfaces 27 (in step 110), the request responding unit 311 specifies the network interface 27 through which the inquiry has been received (in step 120).

Then, the MIB information generating unit 312 refers to the setting mode information stored in the setting-information storage unit 33. If the MIB information generating unit 312 determines that the currently selected setting mode is the ready-made setting (YES in step 210), and if the network interface 27 through which the inquiry has been received is a network interface operating for the apparatus manager (YES in step 130), the MIB information generating unit 312 refers to the settings for the apparatus manager in the ready-made setting information, extracts the corresponding pieces of MIB information, and generates MIB information for the apparatus manager (in step 140). If the network interface 27 through which the inquiry has been received is a network interface operating for the non-manager (NO in step 130), the MIB information generating unit 312 refers to settings for a non-manger in the ready-made setting information. The MIB information generating unit 312 extracts the corresponding pieces of MIB information excluding the specific information which is not to be transmitted, and modifies values of pieces of MIB information, thereby generating MIB information for a non-manager (in step 150).

If the MIB information generating unit 312 determines that the currently selected setting mode is the custom setting, by referring to the setting mode information stored in the setting-information storage unit 33 (NO in step 210), the MIB information generating unit 312 refers to information corresponding to the network interface through which the inquiry has been received, in the custom setting information, extracts the corresponding pieces of MIB information, and generates MIB information which is to be transmitted (in step 220).

As described above, when the MIB information generating unit 312 generates the MIB information which is to be transmitted, the request responding unit 311 transmits the generated MIB information through the network interface 27 through which the inquiry has been received (in step 160).

In the present exemplary embodiment, as described above, information which is to be transmitted to only one management apparatus 13, such as information about consumables, is transmitted to only one management apparatus 13, avoiding duplicate orders of consumables, or the like.

Figure 15:
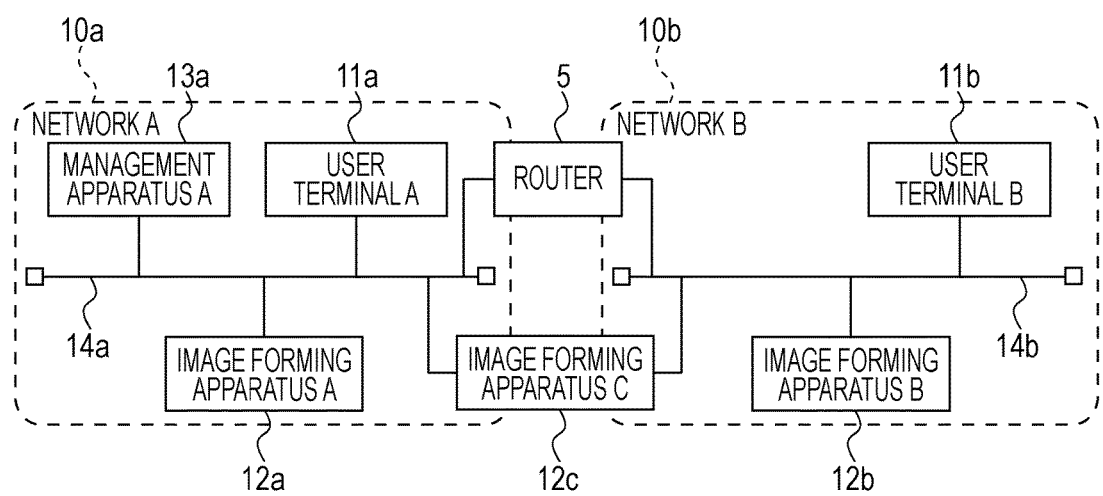
FIG. 15 is a diagram illustrating another configuration of the network system according to the exemplary embodiment.

FIG. 15 is a diagram illustrating a second configuration of the network system according to the present exemplary embodiment. As it is clear when the second configuration is compared with that in the network configuration diagram illustrated in FIG. 1, this system omits the management apparatus 13b from the network B, and the network 14a is connected to the network 14b via a router 5, whereby the management apparatus 13a monitors all of the image forming apparatuses 12a, 12b, and 12c included in the networks A and B. In this case, the management apparatus 13a receives not only MIB information transmitted from the network interface 27a of the image forming apparatus 12c but also MIB information transmitted from the network interface 27b via the router 5. In the present exemplary embodiment, even in this system configuration, the management apparatus 13a does not receive duplicate information about consumables of the image forming apparatus 12c.

In the present exemplary embodiment, the description is made by taking information about consumables as exemplary MIB information which is set as the specific information and which is transmitted to only one management apparatus. Other pieces of MIB information may be included in the specific information. In the present exemplary embodiment, the custom setting enables information describing which MIB information is to be transmitted, to be set as appropriate, enabling easy setting according to the operation of the network system.

In the present exemplary embodiment, the example in which SNMP is used as a protocol for monitoring a network is described. Other protocols and applications may be applied to the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a plurality of network interfaces configured to be connected to different networks;
   a management-information storage configured to store management information;
   a processor configured to:
   extract information, in accordance with a management information transmission request received via one of the network interfaces, which is to be transmitted through the one of the network interfaces through which the request has been received, from the management information, and generate transmission management information to be transmitted;
   specify a first network interface of the plurality of network interfaces from a second network interface of the plurality of network interfaces; and
   a transmitter configured to transmit the transmission management information generated by the processor, from the one of the network interfaces through which the request has been received;
   wherein, in response to the one of the network interfaces through which the request has been received being the first network interface through which a first information including a specific information of the image forming apparatus is to be transmitted, the processor is configured to generate the transmission management information which includes the first information of the image forming apparatus,
   wherein, in response to the one of the network interfaces through which the request has been received being the second network interface through which a second information not including the specific information of the image forming apparatus is to be transmitted, the processor is configured to generate the transmission management information which includes the second information of the image forming apparatus,
   wherein the specific information includes information about consumables of the image forming apparatus,
   wherein the first network interface is configured to transmit the first information including the specific information to a manager apparatus of the image forming apparatus, and
   wherein the second network interface is configured to transmit the second information not including the specific information to a non-manager apparatus of the image forming apparatus.

2. The image forming apparatus according to claim 1, wherein the processor is further configured to:
   generate setting information in accordance with a setting operation performed by a user.

3. The image forming apparatus according to claim 1, wherein the specific information is information referred to in order to enable the image forming apparatus to be continuously used.

4. The image forming apparatus according to claim 1, wherein the processor is further configured to:
   change a value of the specific information, in response to the request being received by the second network interface through which the second information not including the specific information of the image forming apparatus is to be transmitted, to a different value from a corresponding value of the first information.

5. The image forming apparatus according to claim 1, wherein the first information comprises management information base (MIB) information of the image forming apparatus, and
   the processor generates the transmission management information which includes the second information by omitting the specific information from the first information in the second information and changes a value indicating an actual level of remaining consumables of the image forming apparatus to a second value indicating a different level of remaining consumables of the image forming apparatus other than the actual level.

6. A non-transitory computer readable medium storing a program causing a computer to execute a process, the computer included in an image forming apparatus having a plurality of network interfaces that are to be connected to different networks, the process comprising:
   storing management information;
   in accordance with a management information transmission request received via one of the network interfaces, extracting information which is to be transmitted through the one of the network interfaces through which the request has been received, from the management information, and generating transmission management information to be transmitted;
   transmitting the generated transmission management information from the one of the network interfaces through which the request has been received; and
   specifying the a first network interface of the plurality of network interfaces from a second network interface of the plurality of network interfaces,
   wherein, in response to the one of the network interfaces through which the request has been received being the first network interface through which a first information including a specific information of the image forming apparatus is to be transmitted, the management-information generating unit is configured to generate the transmission management information which includes the first information of the image forming apparatus, wherein, in response to the one of the network interfaces through which the request has been received being the second network interface through which a second information not including the specific information of the image forming apparatus is to be transmitted, the management-information generating unit is configured to generate the transmission management information which includes the second information of the image forming apparatus, wherein the specific information includes information about consumables of the image forming apparatus, wherein the first network interface is configured to transmit the first information including the specific information to a manager apparatus of the image forming apparatus, and wherein the second network interface is configured to transmit the second information not including the specific information to a non-manager apparatus of the image forming apparatus.

7. An image forming method performed on a computer included in an image forming apparatus having a plurality of network interfaces that are to be connected to different networks, the method comprising:

storing management information;

in accordance with a management information transmission request received via one of the network interfaces, extracting information which is to be transmitted through the one of the network interfaces through which the request has been received, from the management information, and generating transmission management information to be transmitted;

transmitting the generated transmission management information from the one of the network interfaces through which the request has been received; and specifying a first network interface of the plurality of network interfaces from a second network interface of the plurality of network interfaces, wherein, in response to the one of the network interfaces through which the request has been received being the first network interface through which a first information including a specific information of the image forming apparatus is to be transmitted, the management-information generating unit is configured to generate the transmission management information which includes the first information of the image forming apparatus, wherein, in response to the one of the network interfaces through which the request has been received being the second network interface through which a second information not including the specific information of the image forming apparatus is to be transmitted, the management-information generating unit is configured to generate the transmission management information which includes the second information of the image forming apparatus, wherein the specific information includes information about consumables of the image forming apparatus, wherein the first network interface is configured to transmit the first information including the specific information to a manager apparatus of the image forming apparatus, and wherein the second network interface is configured to transmit the second information not including the specific information to a non-manager apparatus of the image forming apparatus.

* * * * *